United States Patent
Joos

(10) Patent No.: US 9,677,678 B2
(45) Date of Patent: Jun. 13, 2017

(54) VENTING VALVE FOR A CONTAINER FOR LIQUIDS

(71) Applicant: Andreas Stihl AG & Co. KG, Waiblingen (DE)

(72) Inventor: Steffen Joos, Murr (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 36 days.

(21) Appl. No.: 14/465,854

(22) Filed: Aug. 22, 2014

(65) Prior Publication Data

US 2015/0053282 A1 Feb. 26, 2015

(30) Foreign Application Priority Data

Aug. 24, 2013 (EP) ..................................... 13004183

(51) Int. Cl.
| | |
|---|---|
| *F16K 24/06* | (2006.01) |
| *F16K 24/04* | (2006.01) |
| *F16K 17/04* | (2006.01) |
| *F02M 37/20* | (2006.01) |
| *F02M 37/00* | (2006.01) |

(52) U.S. Cl.
CPC ............. *F16K 24/04* (2013.01); *F02M 37/20* (2013.01); *F16K 17/04* (2013.01); *F16K 24/06* (2013.01); *F02M 37/0076* (2013.01); *Y10T 137/7837* (2015.04)

(58) Field of Classification Search
CPC ........... F16K 17/04; F16K 24/04; F16K 24/06

USPC ................................................. 137/511, 550
See application file for complete search history.

(56) References Cited

U.S. PATENT DOCUMENTS

| | | | | |
|---|---|---|---|---|
| 4,331,120 A | * | 5/1982 | Hiramatu | ........... F02M 25/0854 |
| | | | | 123/519 |
| 2005/0022874 A1 | | 2/2005 | Hettmann et al. | |
| 2006/0016436 A1 | * | 1/2006 | Groom | ................... F02M 25/08 |
| | | | | 123/520 |
| 2006/0169146 A1 | | 8/2006 | Cho | |

FOREIGN PATENT DOCUMENTS

| | | |
|---|---|---|
| GB | 1019261 | 2/1966 |
| JP | 02 300577 | 12/1990 |
| JP | 2001 314285 | 11/2001 |

* cited by examiner

*Primary Examiner* — Kevin Lee
*Assistant Examiner* — P. Macade Nichols
(74) *Attorney, Agent, or Firm* — Gudrun E. Huckett

(57) ABSTRACT

A venting valve for a container for liquid has a valve housing having a pressure compensation passage connecting the container interior with the container exterior. A valve member is arranged in the valve housing and controls the pressure compensation passage. An air-permeable filter body is secured within the valve housing and covers the pressure compensation passage, wherein a face of the filter body faces the container interior. A filter element covers the face of the filter body that is facing the container interior. The filter element is a securing element for the filter body. The filter element closes off an opening of the valve housing that opens into the container interior.

20 Claims, 2 Drawing Sheets

VENTING VALVE FOR A CONTAINER FOR LIQUIDS

BACKGROUND OF THE INVENTION

The invention relates to a venting valve for a container for liquids, in particular for a fuel tank in a hand-held power tool. Such a venting valve comprises a valve housing as well as a valve member which is arranged in the valve housing, wherein the valve member controls a pressure compensation passage that connects the interior of the container with the exterior of the container. An air-permeable filter body is secured within the valve housing and covers the pressure compensation passage. A face of the filter body is facing the interior of the container.

A venting valve of this kind is in particular used in a fuel tank of a motor chainsaw, a cut-off machine, a trimmer, a blower, a hedge trimmer or the like. It is supposed to ensure, on the one hand, a satisfactory venting action of the fuel tank and, on the other hand, is supposed to ensure that fuel cannot escape through the venting valve, independent of the position in which the power tool is used.

Such a venting valve is disclosed in US 2005/0022874 A1. It is comprised of a valve housing as well as a valve member that is arranged within the valve housing and controls a pressure compensation passage. The pressure compensation passage connects the interior of the container with the exterior of the container, i.e., the immediate external environment, in order to ensure pressure compensation. In order to keep the valve member free of dirt, in the valve housing an air-permeable filter body is provided that covers the pressure compensation passage and is facing with one face the interior of the container.

The filter body which is facing the interior of the container is secured in its position at the valve housing by a securing ring. A large portion or most of the surface that is facing the interior of the container is not covered, i.e., is exposed.

In particular when using the venting valve in a fuel tank, it has been found in practice that the dirt that is contained within the liquid container will deposit within the filter body and impair the filter body's function. In this context, it may happen that dirt that is contained in the fuel penetrates the filter body and impairs the function of the valve.

It is the object of the present invention to design a venting valve of the aforementioned kind for a liquid container in such a way that embedding or depositing of dirt particles within the filter body arranged in the interior of the container is prevented.

SUMMARY OF THE INVENTION

In accordance with the present invention, this is achieved in that the venting valve comprises an additional filter element, wherein the filter body at the face that is facing the interior of the container is covered by the additional filter element, wherein the additional filter element is formed as a securing element for the filter body, and wherein the additional filter element closes off the opening of the valve housing that opens relative to the interior of the container.

The filter body is covered at the face which is facing the interior of the container by an additional filter element that substantially closes off the opening of the valve housing that opens relative to the container interior and, in this way, covers the filter body itself. Dirt particles contained in the liquid are therefore prevented from embedding in the filter body by means of the additional filter element. The service life of the venting valve is thus improved.

The material of the filter body has a first pore size and the material of the additional filter element has a second pore size. In this connection, it is provided that the second pore size of the additional filter element is smaller, in particular significantly smaller, than the first pore size of the filter body. In this way, it is ensured that dirt particles contained in the liquid cannot embed in the larger pores of the filter body.

The additional filter element is comprised expediently of a synthetic fiber fabric, in particular a polyester spunbond material which is known by the name PARAFIL®. On the one hand, this synthetic fiber fabric has a satisfactory air permeability and, on the other hand, it ensures retention of dirt particles contained in the fluid. Moreover, a filter element comprised of such a material is shape-stable to a high degree while it is elastic to a satisfactory degree.

Preferably, the additional filter element covers substantially completely the face of the filter body which is facing the container interior.

The filter body in the valve housing is expediently a cylindrical foamed material filter while the additional filter element is formed of a synthetic fiber fabric in particular as a stamped part. Since the additional filter element is comprised of a shape-stable, bending-elastic (flexible) material, it can be utilized especially as a securing element for the filter body of the valve housing. The securing element is preferably designed as a securing plate, expediently, as a round securing plate.

The additional filter element which is utilized as a securing element has a thickness that is approximately 5% to 10% of the thickness of the filter body.

DESCRIPTION OF THE PREFERRED EMBODIMENTS

Figure 1:
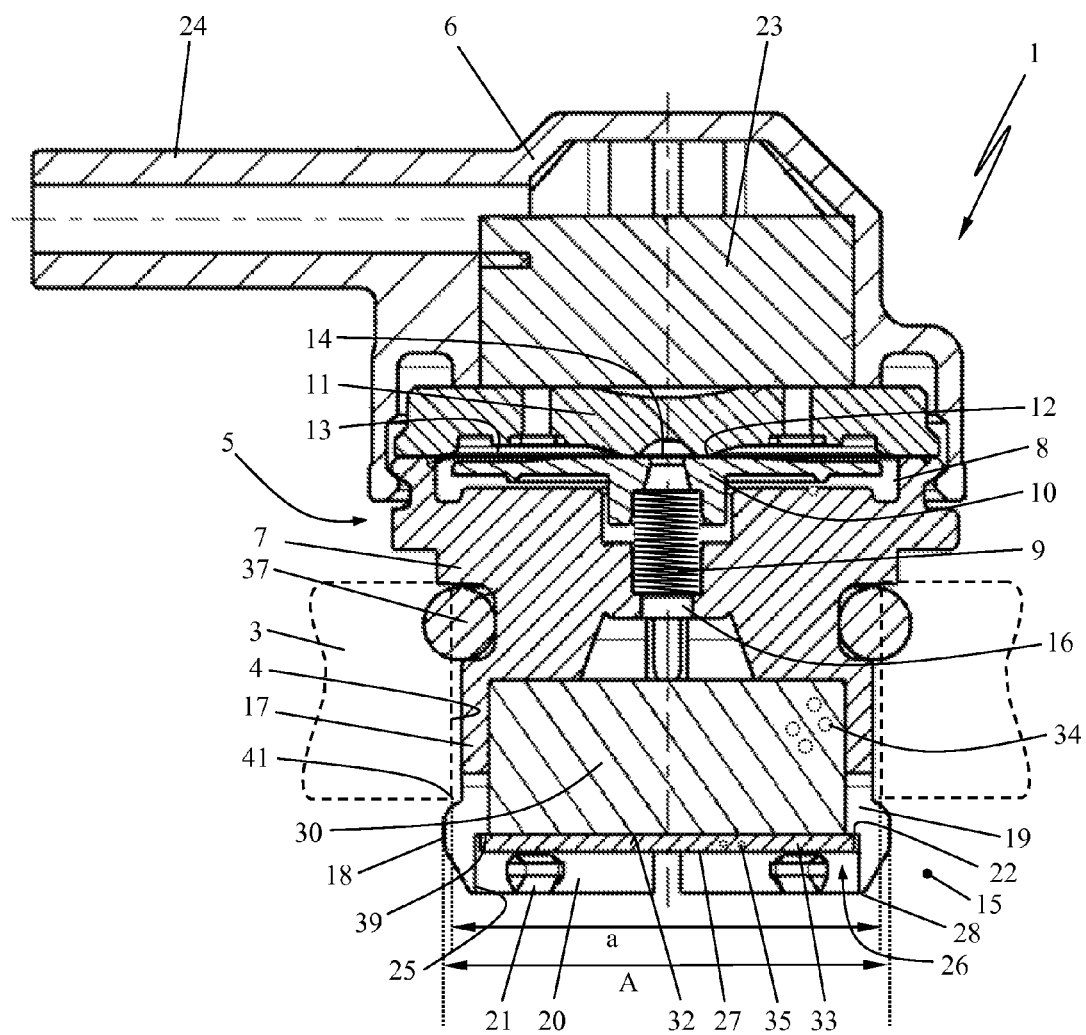
FIG. 1 is a schematic section view of the venting valve which is mounted in a container wall.

A venting valve 1 for a liquid container 2 (see FIG. 3) is illustrated in cross-section in FIG. 1. In the illustrated embodiment, the container 2 is designed as a fuel tank but can also be a container for lubricant oil, chain oil, or the like. In the container wall 3 of the liquid container 2, a mounting opening 4 for the venting valve 1 is provided.

The venting valve 1 is arranged in a valve housing 5 which is comprised of a valve cover 11 and a base member 7. Between the valve cover 11 and the base member 7, a receiving space 8 is formed in which a valve member comprising a valve plate 10 is arranged. The valve plate 10 is forced by a coil spring 9 at a predetermined force against a sealing seat 12 which is formed in the valve cover 11 closing of the receiving space 8. Between the valve plate 10 and the sealing seat 12, a sealing membrane 13 is arranged which is comprised advantageously of a plastic film and has a central membrane opening 14. The valve plate 10 together with the sealing membrane 13 is forced by the coil spring 9 tightly against the sealing seat 12 so that a pressure compensation passage 16 that opens into the container interior 15 is seal-tightly closed off.

Figure 3:
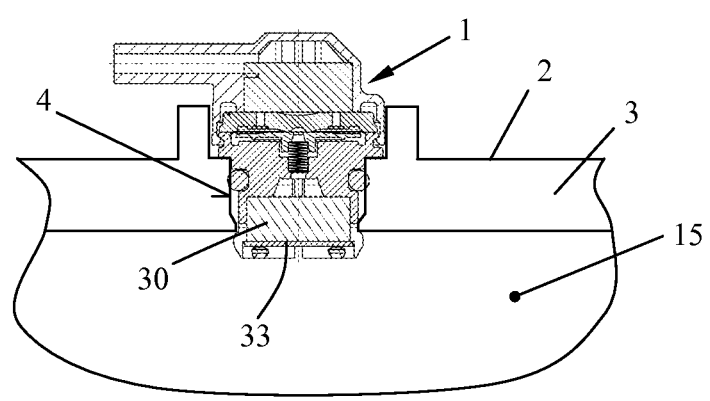
FIG. 3 is a schematic illustration of a venting valve which is mounted in a fuel container wall.

The base member 7 which is formed cylindrically in the area of the valve plate 10 has a monolithically formed connecting socket 17 that extends axially in the direction of the container interior 15 and, in the mounted state, is secured in the mounting opening 4 of the container wall 3. A circumferentially extending outer locking rim 18 at the free end of the connecting socket 17 engages an inner edge 41 of the container wall 3 at the interior 15 of the container 15 so that the venting valve 1 is secured positively (with form fit) in the mounting opening 4 on the liquid container 2 (FIG. 3).

Figure 2:
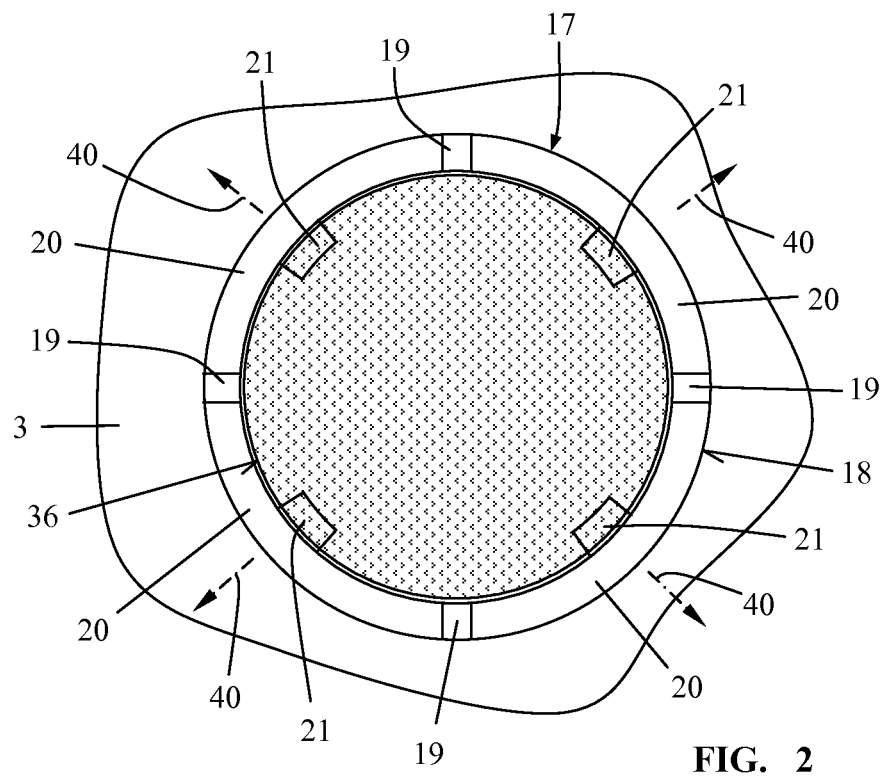
FIG. 2 is a plan view of a venting valve positioned within the container wall and viewed in the direction of arrow II in FIG. 1.

The connecting socket 17 has axial slots 19 in its socket wall; the slots 19 extend approximately across half the height of the connecting socket 17. Across the circumference of the connecting socket 7, as shown in FIG. 2, four such axial slots 19 are provided so that the socket wall is divided about the circumference into four locking tongues 20. The locking tongues 20 have in circumferential direction approximately the same length. Two axial slots 19 are positioned diametrically opposite each other, respectively. On their outer side, each locking tongue 20 has a locking rim 18; on the inner side of the locking tongue 20, at least one locking nose 21 is provided which projects radially into the opening 25 of the connecting socket 17. Below the locking noses 21, the socket wall or the locking tongues 20 comprise a circumferentially extending shoulder 22.

In order to protect the pressure compensation passage 16 and in particular the sealing seat 12 from becoming soiled by dust particles or the like, the valve housing 5 is covered by a housing cover 6 which at the same time secures the valve cover 11 on the base member 7. The housing cover 6 is locked on the base member 7. In the housing cover 6 an air filter 23 is provided. The housing cover 6 can be provided with a connector 24 which is connected, for example, to the clean chamber of an air filter.

The pressure compensation passage 16 connected to the interior 15 of the container opens approximately centrally into the connecting socket 17 and is covered by an air-permeable filter body 30. The filter body 30 is received in the connecting socket 17. A face of the filter body 30 is facing the interior 15 of the container. In the illustrated embodiment, the filter body 30 is a cylindrical filter body and is comprised in particular of foamed material having a first face 31 that covers the pressure compensation passage and whose opposite second face 32 is facing the interior 15 of the container. The filter body 30 fills the connecting socket 17 substantially completely, wherein the face 32 of the filter body 30 which is facing the interior 15 of the container is covered by an additional filter element 33. The filter element 33 closes off the opening 25 of the valve housing 5; in the illustrated embodiment, the opening 25 of the connecting socket 17 that opens relative to the interior 15 of the container is substantially completely closed or covered by the filter element 33.

The material of the filter body 30 has a first pore size 34; the material of the additional filter element 32 has a second pore size. As shown in the embodiment, the second pore size 35 of the additional filter element 32 is expediently smaller than the first pore size 34 of the filter body 30.

The filter body 30 is preferably a cylindrical foamed material filter. The additional filter element is expediently formed of a synthetic fiber fabric and is comprised, for example, of a polyester spunbond material which is known under the name PARAFIL®. As in particular illustrated in FIG. 2, the additional filter element 33 covers the face 32 of the filter body 30 which is facing the interior 15 of the container across a large portion of the lateral surface. In the illustrated embodiment, the face 32 of the filter body 30 is completely covered by the additional filter element 33.

The additional filter element 33 is in particular a bending-elastic (flexible) shaped part which secures as a securing element 26 the filter body 30 in its position on the valve housing 5, i.e., in the connecting socket 17 of the valve housing 5.

Expediently, the securing element 26 is embodied as a securing plate 27, in particular as a round securing plate. Since the filter element 33 is comprised of a substantially shape-stable synthetic fiber fabric, it can be produced in a simple way as a stamped part, wherein this stamped part advantageously is embodied as a round securing plate 27.

The inner shoulder 22 which is formed at the open end 28 of the connecting socket 17 of the valve housing 5 serves as a contact surface 39 for the securing element 26, in particular the securing plate 27.

The filter body 30 is designed such that it radially completely fills the connecting socket 17 and extends axially up to the contact surface 39 or the shoulder 22. It can be expedient when the filter body 30 slightly projects past the contact surface 39. The shape-stable further filter element 33, as a securing element 26, is snapped into the open end of the connecting socket 17 of the valve housing 5. In this context, the locking tongues 20 deflect radially in outward direction in the direction of arrow 40 (FIG. 2) until the rim 36 of the securing element 26 passes across the locking noses 21 of the locking tongues 20 and the locking tongues 20 return elastically in a direction opposite to arrow 40. The rim 36 of the additional filter element 33 (securing element 26) is positioned on the contact surface 39. In this position, the additional filter element 33 is fixed by the locking noses 21 of the locking tongues 20 for which purpose the locking noses 21 engage across the rim 36 of the securing element 26. The filter element 33 which is embodied as a securing element 26 is secured captively on the valve housing 5. Since the additional filter element 33, aside from its filtering function, is also simultaneously acting as a securing element 26 providing the captive action for the filter body 30 in the valve housing 5, the filter element 33 provides a dual function.

The mounting opening 4 in the container wall 2 has an inner diameter a. The diameter a less than the outer diameter A of the connecting socket 17 of the valve housing (FIG. 1) measured at the locking rim 18. When the mounted venting valve 1 is pressed into the opening 4 of the container wall 3 of the liquid container 2 (FIG. 3), the locking tongues 20 are forced radially inwardly in a direction opposite to the direction of arrow 40 (FIG. 2). Since the additional filter element 33 is shape-stable as a securing element 26 but is bending-elastic (flexible), the deflection movement of the locking tongues 20 opposite to the direction of arrow 40 is not impaired by the filter element 33/securing element 26. The bending-elastic (flexible) securing element 26 deforms elastically.

As soon as the outer locking rims 18 of the locking tongues 20 have engaged across the inner edge 41 of the mounting opening 4, the locking tongues 20, supported by the securing plate 27 that is returning into its original shape, are returned into their initial positions and engage across the inner edge 41. The venting valve 1 is captively secured in the mounting opening 4 wherein a sealing ring 37, which is positioned in the mounting opening 4 and is embodied in the embodiment as an O-ring, seals the valve housing 5 in the mounting opening 4.

After the venting valve 1 has snapped into the mounting opening 4 of the container wall 3, the securing plate 27 enhances as a result of its stiffness the locking position of the locking tongues 20 so that a safe seat of the venting valve 1 in the mounting opening 4 of the liquid container 2 is ensured.

Since the additional filter element 33 is made of a material which continues to allow pressure compensation and is moreover provided with finer pores than the material of the filter body 30, it is ensured that dirt contained in the liquid container 2 cannot penetrate into the valve housing 5.

The specification incorporates by reference the entire disclosure of European priority document 13 004 183.3 having a filing date of Aug. 24, 2013.

While specific embodiments of the invention have been shown and described in detail to illustrate the inventive principles, it will be understood that the invention may be embodied otherwise without departing from such principles.

What is claimed is:

1. A venting valve for a liquid container, the venting valve comprising:
   a valve housing comprising a pressure compensation passage connecting an interior of a liquid container with an exterior of the liquid container;
   a valve member arranged in the valve housing, wherein the valve member is adapted to control the pressure compensation passage;
   an air-permeable filter body secured within the valve housing by a filter element and covering the pressure compensation passage, wherein a face of the filter body faces the interior of the liquid container;
   the filter element covering the face of the filter body that is facing the interior of the liquid container and closing off an opening of the valve housing that opens into the interior of the liquid container;
   wherein the filter element comprises a rim and the valve housing comprises locking noses, wherein the rim of the filter element is secured by the locking noses in the valve housing so that filter element supports itself on the locking noses that engage across the rim and the filter element secures the filter body.

2. The venting valve according to claim 1, wherein a material of the filter body has a first pore size and the material of the filter element has a second pore size, wherein the second pore size of the filter element is smaller than the first pore size of the filter body.

3. The venting valve according to claim 1, wherein the filter element is comprised of a synthetic fabric material.

4. The venting valve according to claim 3, wherein the synthetic fabric is a polyester spunbond material.

5. A venting valve for a liquid container, the venting valve comprising:
   a valve housing comprising a pressure compensation passage connecting an interior of a liquid container with an exterior of the liquid container;
   a valve member arranged in the valve housing, wherein the valve member is adapted to control the pressure compensation passage;
   an air-permeable filter body secured within the valve housing and covering the pressure compensation passage, wherein a face of the filter body faces the interior of the liquid container;
   a filter element arranged on the face of the filter body that is facing the interior of the liquid container;
   wherein the filter element completely covers the face of the filter body facing the interior of the liquid container such that the filter element forms a closure of the venting valve relative to the interior of the liquid container, wherein the closure is exposed to the interior of the liquid container and extends across an entire surface area of the face of the air-permeable filter body that faces the interior of the liquid container.

6. The venting valve according to claim 1, wherein the filter body is a foamed material filter.

7. The venting valve according to claim 6, wherein the foamed material filter is cylindrical.

8. The venting valve according to claim 1, wherein the filter element is a stamped part.

9. The venting valve according to claim 1, wherein the filter element is a bending-elastic shaped part.

10. The venting valve according to claim 1, wherein the filter element is a securing plate.

11. The venting valve according to claim 10, wherein the securing plate is a round securing plate.

12. The venting valve according to claim 1, wherein the filter element is axially fixed between a contact surface of the valve housing and locking noses of the valve housing.

13. The venting valve according to claim 1, wherein the filter element has a first thickness and the filter body has a second thickness, wherein the first thickness is 5% to 10% of the second thickness.

14. The venting valve according to claim 1, wherein the liquid container is a fuel tank of a hand-held power tool.

15. The venting valve according to claim 14, wherein the power tool is a motor chainsaw, a cut-off machine, a trimmer, or a blower.

16. The venting valve according to claim 1, wherein the filter element is snapped into the valve housing.

17. The venting valve according to claim 1, wherein the liquid container comprises a mounting opening and wherein the valve housing comprises a connecting socket that is secured in a locked position in the mounting opening of the liquid container.

18. The venting valve according to claim 17, wherein the connecting socket comprises axial slots and an outer locking rim engaging an inner edge of the mounting opening of the liquid container.

19. The venting valve according to claim 17, wherein a stiffness of the filter element secures the locked position of the connecting socket in the mounting opening of the liquid container.

20. A venting valve for a container for liquid, the venting valve comprising:
   a valve housing comprising a pressure compensation passage connecting an interior of a container with an exterior of the container;
   a valve member arranged in the valve housing, wherein the valve member is adapted to control the pressure compensation passage;
   an air-permeable filter body secured within the valve housing by a filter element and covering the pressure compensation passage, wherein a face of the filter body faces the interior of the container;
   the filter element covering the face of the filter body that is facing the interior of the container, wherein the filter element is comprised of a polyester spunbond fabric material;
   wherein only the filter element secures the filter body in the valve housing;
   wherein the filter element closes off an opening of the valve housing that opens into the interior of the container.

* * * * *